US006322382B1

(12) United States Patent
Viallet

(10) Patent No.: US 6,322,382 B1
(45) Date of Patent: *Nov. 27, 2001

(54) BAY FOR RECEIVING REMOVABLE COMPUTER PERIPHERAL DEVICES

(75) Inventor: Franck Viallet, Meylan (FR)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,215

(22) Filed: Jul. 15, 1999

(30) Foreign Application Priority Data

Jul. 17, 1998 (EP) ........................................ 98401863

(51) Int. Cl.[7] .......................... H01R 13/64; H01R 13/73; H02B 1/01

(52) U.S. Cl. ........................................ 439/248; 439/564

(58) Field of Search .................................. 439/248, 247, 439/564, 565

(56) References Cited

U.S. PATENT DOCUMENTS

| | | | | |
|---|---|---|---|---|
| 4,214,505 | * | 7/1980 | Aimar | 411/373 |
| 4,731,925 | | 3/1988 | Tanishi et al. . | |
| 4,988,308 | | 1/1991 | Toedtman . | |
| 5,088,935 | * | 2/1992 | Dise et al. | 439/573 |
| 5,316,423 | | 5/1994 | Kin . | |
| 5,652,695 | | 7/1997 | Schmitt . | |

FOREIGN PATENT DOCUMENTS

| | | |
|---|---|---|
| 549960A2 | 12/1992 | (EP) . |
| 549960A3 | 12/1992 | (EP) . |
| 555733A1 | 2/1993 | (EP) . |

OTHER PUBLICATIONS

European Search Report, EP 98 40 1863, Nov. 26, 1998.

* cited by examiner

*Primary Examiner*—Brian Sircus
*Assistant Examiner*—Chandrika Prasad

(57) ABSTRACT

The invention offers a particularly simple self-centering floating connector mechanism. For this purpose, the connector (20) is attached to a frame (24), at a predetermined distance therefrom, by resilient fasteners (26).

14 Claims, 1 Drawing Sheet

BAY FOR RECEIVING REMOVABLE COMPUTER PERIPHERAL DEVICES

BACKGROUND OF THE INVENTION

1. Field of the Invention

The present invention relates to back-plane connectors and more specifically to a bay for receiving a removable computer peripheral device, such as a hard disk drive or a CD-ROM drive, configured for instance according to the Intel-Microsoft-Compaq "Device Bay" standards.

2. Description of the Related Art.

FIG. 1 schematically shows a removable peripheral device 10 being inserted into a bay 12. Bay 12 includes a back-plane 14 provided with a connector 16 adapted to mate a corresponding connector (not shown) on the back of device 10. Cooperating guiding means (not shown) of device 10 and bay 12 ensure that, when device 10 is fully pushed into the bay, the connectors of the back-plane and of device 10 engage each other. In practice, the two connectors will not exactly face each other, whereby they may be damaged upon engagement.

Some connectors are specifically designed to bend to a certain extent for compensating a misalignment. However, in some cases, the bending of the connectors may not be sufficient for compensating a misalignment. In other cases, although a misalignment may be compensated by the bending, an intensive use will make the connectors have a short life time.

U.S. Pat. No. 5,652,695 discloses a removable hard drive carrier and bay assembly wherein the hard drive carrier has a floating connector for compensating a misalignment with a mating connector. The carrier connector is mounted on a printed circuit board, or PCB, which is held in slots with lateral and longitudinal clearance.

A drawback of this floating connector mechanism is that the connector does not have a known rest position, since all the positions within the floating range are stable. As a consequence, if the connector is in a limit rest position where one edge of the PCB is fully engaged in a slot, a misalignment which would lead the connector to go in an opposite limit position may not be compensated.

BRIEF SUMMARY OF THE INVENTION

An object of the present invention is to provide a particularly simple self-centering floating connector mechanism.

This object is achieved by a floating connector attached to a frame, at a predetermined distance therefrom, by resilient fasteners.

According to an embodiment of the invention, the connector is mounted on a printed circuit board which is attached by said fasteners to the frame.

According to an embodiment of the invention, each of said fasteners is in the form of a nail adapted to pass through holes of the printed circuit board and of a plate of the frame, having grooves for axially holding the printed circuit board and the plate apart from each other.

According to an embodiment of the invention, each nail has a conical portion extended by a tail.

The present invention also provides electronic apparatus having a bay for receiving a removable peripheral device, the bay comprising a floating connector as mentioned above.

In practical implementations, for instance to personal computers, it is preferable for reasons of cost and reliability that the floating connector be mounted in the bay, rather than on the removable peripheral device. Moreover, if the floating connector is mounted in the bay, the fact that the removable device is already at least to some extent mobile within the bay allows a further degree of relative movement between the mating connectors which provides for easier and more convenient mating. Nevertheless, the possibilities that the floating connector be mounted on a removable peripheral device, or on both a removable peripheral device and within the bay are not excluded.

BRIEF DESCRIPTION OF THE DRAWINGS

The foregoing and other objects, features, aspects and advantages of the invention will become apparent from the following detailed description of embodiments, given by way of illustration and not of limitation with reference to the accompanying drawings.

In FIG. 2, a connector 20 for a removable device and bay assembly within a personal computer is mounted on a printed circuit board, or PCB, 22. Connector 20 could be the connector located at the back of the removable device 10 but it is preferably the back-plane connector of the bay, where more space is available for mounting.

DETAILED DESCRIPTION OF THE INVENTION

In the preferred embodiment, the bay is configured according to the Device Bay Interface Specification (revision 0.85) available from Microsoft Corporation.

Figure 3:
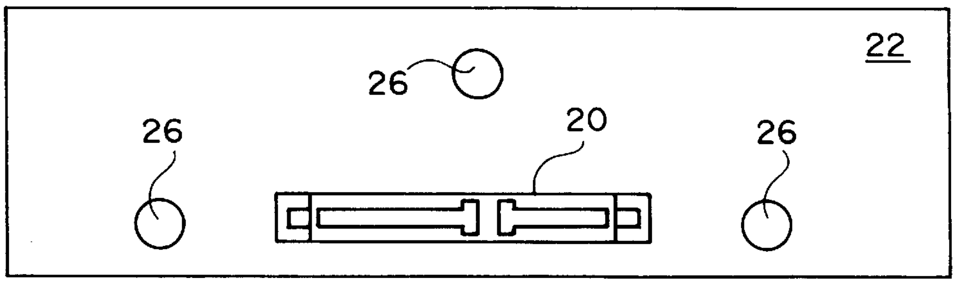
FIG. 3 shows a top view of the assembly of FIG. 2.

According to the invention, PCB 22 is attached to a back-plane plate 24, at a predetermined distance therefrom, by resilient fasteners 26. As shown in FIG. 3, at least three non aligned fasteners 26 are used to avoid a tilting of PCB 22. The fasteners 26 are mounted with a small clearance in holes of PCB 22 and plate 24.

With this arrangement, if PCB 22 is urged laterally, the middle portions of fasteners 26, between PCB 22 and plate 24, will allow a lateral movement by bending. If the lateral force on PCB 22 or connector 20 is canceled, fasteners 26 bend back elastically to their initial shapes, whereby connector 20 regains its initial center position.

The lateral freedom of movement of connector 20 and PCB 22 depends on the distance between PCB 22 and plate 24 and on the elasticity of fasteners 26.

Of course, the resilient fasteners 26 also allow PCB 22 and connector 20 to move, resiliently, in the axial direction of the fasteners, which is beneficial in absorbing shocks caused when driving the carrier home in the bay.

Figure 1:
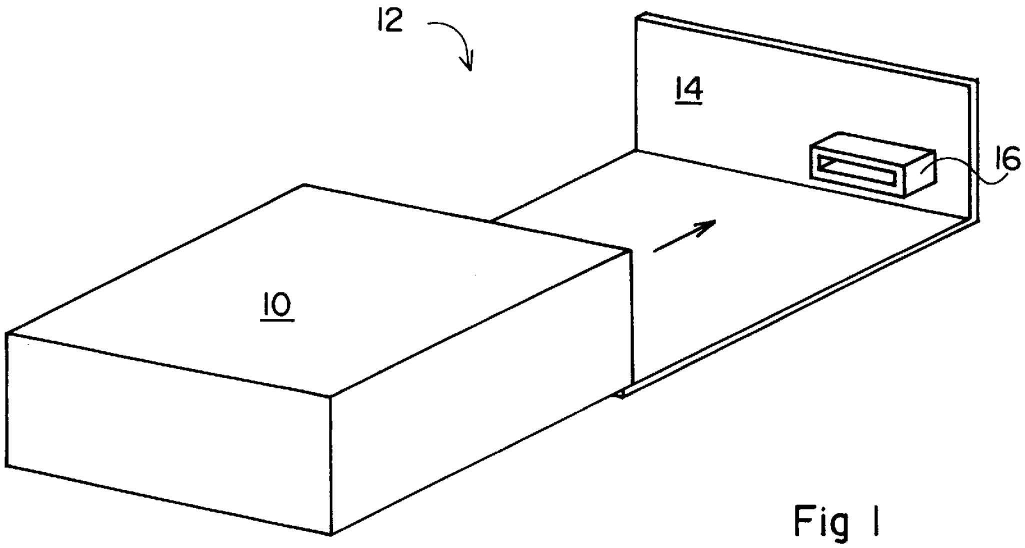
FIG. 1, previously described, schematically shows a removable peripheral device being inserted into a connection bay.
Figure 2:
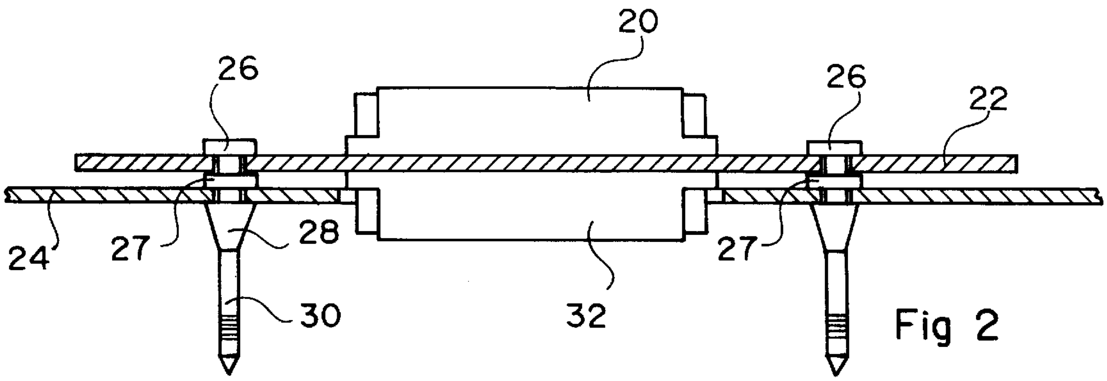
FIG. 2 shows a side section view of an embodiment of a floating connector assembly according to the present invention.

FIG. 2 shows exemplary resilient fasteners 26. They are rubber fasteners of the type used to resiliently mount cooling fans to casings in machines manufactured by Hewlett Packard. The fasteners are in the shape of nails which pass through holes of PCB 22 and plate 24. Each fastener 26 comprises two annular grooves in which PCB 22 and plate 24 are respectively held. The lateral wall of one of the grooves of each fastener 26 is defined by the base of a cone 28 whose top is extended by a tail 30. Cone 28 and tail 30 simplify the mounting of the fastener in the holes of PCB 22 and plate 24: first tail 30 is inserted through the holes until cone 28 rests in one hole. The tail 30 then protrudes from the other hole and may be gripped with a specific tool with which cone 28 is pulled through the holes of PCB 22 and plate 24 up to the position shown in FIG. 2, where PCB 22 and plate 24 are each held in one groove.

As shown in FIG. 2, an additional connector 32 is usually provided on PCB 22 opposite connector 20. Connector 32 extends through an opening of plate 24 so that it may be connected with ribbon cables, or any other appropriate means, to devices behind the back-plane.

As an alternative, connectors 20 and 32, and PCB 22 may be a single part having preconnected cables.

Many alterations and modifications of the above described embodiments will appear to those skilled in the art. For example, PCB 22 may be attached by only two fasteners 26 and one of its edges be inserted in a slot.

Of course, a floating connector according to the invention is not limited to back-plane connectors. It may be used in any application where two mating connectors may be misaligned.

I claim:

1. An electronic apparatus comprising:

a frame;

at least one resilient fastener comprising first and second annular grooves, and a conical section adjacent to said second groove wherein a base of said conical section defines a lateral wall of said second groove; and an electrical connector assembly comprising a first electrical connector mounted on a printed circuit board, wherein said connector assembly is attached to said frame by said at least one resilient fastener and said connector assembly and said frame are positioned a predetermined distance apart from each other by said first and second grooves, said fastener being resiliently deformable away from a central rest position so as to allow said electrical connector assembly to float with respect to said frame.

2. The electronic apparatus of claim 1, wherein said frame and said electrical connector assembly comprise facing pairs of holes and wherein each of said fasteners are adapted to pass through one facing pair of holes, such that said first and second grooves engage said electrical connector assembly and said frame respectively.

3. The electronic apparatus of claim 1, wherein said printed circuit board is attached by said fasteners via holes therein to said frame.

4. The electronic apparatus of claim 3, further comprising a second electrical connector electrically coupled to said first electrical connector and mounted on said printed circuit board to provide an interface to a personal computer.

5. The electronic apparatus of claim 3, wherein said printed circuit board is fastened to said frame by at least three non aligned fasteners to avoid a tilting of said printed circuit board.

6. The electronic apparatus of claim 1, wherein, said conical section of said fastener comprises a tail for allowing said fastener to be pulled into position during manufacturing.

7. The electronic apparatus of claim 1, further comprising a bay for receiving a removable computer peripheral device, said floating electrical connector assembly being mounted within said bay for providing electrical connections to said removable computer peripheral device.

8. Electronic apparatus as claimed in claim 1 in the form of a personal computer.

9. A bay for receiving a removable computer peripheral device comprising:

a frame for slidingly engaging said computer peripheral device;

at least one resilient fastener comprising first and second annular grooves, and a conical section adjacent to said second groove wherein a base of said conical section defines a lateral wall of said second groove; and a first electrical connector mounted on said frame for engaging a second electrical connector mounted on said computer peripheral device, said first electrical connector mounted on said frame utilizing said at least one resilient fastener, such that upon the application of lateral force to said connector, said fastener allows a lateral movement of said connector, and upon the removal of said lateral force, returns said connector to a central rest position.

10. The bay of claim 9, further comprising a third electrical connector electrically coupled to said first electrical connector for providing an interface to a personal computer.

11. The bay of claim 9, wherein said first electrical connector is mounted on a printed circuit board, and wherein said frame and said printed circuit board comprise facing pairs of holes and wherein each of said fasteners are adapted to pass through one facing pair of holes, said fastener grooves axially holding the connector assembly and the frame a predetermined distance apart from each other.

12. The bay of claim 11, wherein said printed circuit board is fastened to said frame by at least three non aligned fasteners to avoid a tilting of said printed circuit board.

13. The bay of claim 11, wherein, said conical section of said fastener comprises by a tail for allowing said fastener to be pulled into position during manufacturing.

14. The bay of claim 9, wherein said fasteners allow axial movement upon the application of axial force, and upon the removal of said axial force, return said connector to a central rest position.

* * * * *